United States Patent
Prueitt

[11] Patent Number: 6,006,538
[45] Date of Patent: Dec. 28, 1999

[54] AIR CONDITIONER ENERGY SYSTEM

[76] Inventor: Melvin L. Prueitt, 161 Cascabel, Los Alamos, N.Mex. 87544

[21] Appl. No.: 09/037,562

[22] Filed: Mar. 9, 1998

[51] Int. Cl.$^6$ .................................................. F25D 9/00
[52] U.S. Cl. ................................ 62/402; 62/89; 62/305; 62/331
[58] Field of Search .......................... 62/89, 305, 314, 62/331, 402, 304

[56] References Cited

U.S. PATENT DOCUMENTS

| | | | |
|---|---|---|---|
| 4,018,060 | 4/1977 | Kinsell et al. | 62/91 |
| 4,031,712 | 6/1977 | Costello | 62/483 |
| 4,214,170 | 7/1980 | Leonard | 290/1 R |
| 4,290,266 | 9/1981 | Twite et al. | 60/641.2 |
| 5,121,610 | 6/1992 | Atkinson et al. | 62/151 |
| 5,150,585 | 9/1992 | Markiewicz | 62/467 |
| 5,419,135 | 5/1995 | Wiggs | 60/641.15 |
| 5,419,147 | 5/1995 | Cooper | 62/171 |

*Primary Examiner*—Henry Bennett
*Assistant Examiner*—Melvin Jones
*Attorney, Agent, or Firm*—Ray G. Wilson

[57] ABSTRACT

An air conditioner system has a boiler for generating a refrigerant vapor from a liquid refrigerant therein and a condenser for condensing the refrigerant vapor to the liquid refrigerant. An expander connects the boiler and the condenser to generate output energy when the refrigerant vapor passes therethrough from the boiler to the condenser in a first direction. A fan produces an ambient air flow through the boiler and the condenser to provide heat input for vaporizing the liquid refrigerant in the boiler and cooling the air flow and for extracting heat from the condenser to condense the refrigerant vapor to the liquid refrigerant. A water mist is generated that contacts the air flow intermediate the boiler and the condenser for further cooling the air flow through heat of vaporization of the water so that air exiting the condenser is cooler than the ambient air flow entering the boiler. The further cooling of the air flow produces air at a temperature effective to condense the refrigerant vapor flowing in the first direction at a rate that produces a pressure differential between the boiler and the condenser that results in sufficient kinetic energy in the refrigerant vapor passing through the expander to produce a net surplus of output energy.

7 Claims, 2 Drawing Sheets

AIR CONDITIONER ENERGY SYSTEM

FIELD OF THE INVENTION

This invention relates to air conditioning units, and, more particularly, to air conditioning units that provide for the co-generation of electricity.

BACKGROUND OF THE INVENTION

There are many sources of energy other than conventional fuels, such as solar, geothermal, waste heat from direct user sources. In many cases, the energy source is a low temperature energy source. For example, U.S. Pat. No. 5,551,238, issued Sep. 3, 1996, teaches the use of concentration energy in a solution, such as brine, to produce useful energy.

U.S. Pat. No. 4,214,170, issued Jul. 7, 1980, teaches a power generation-refrigeration system for extracting energy from a refrigerant with a turbine where the extracted energy is used to compress refrigerant and/or to generate electrical energy. The initial heat source is a low temperature heat source such as solar heated water or waste water from a manufacturing process. Three different heat exchangers and two turbine units are required, as well as a complex refrigerant flow system operating in a refrigerant mode or a power-generating mode.

U.S. Pat. No. 5,150,585 issued Sep. 29, 1992, also teaches a system for extracting energy from a refrigerant to generate electrical energy. The refrigerant is vaporized by the heat in a location to be cooled and additional energy is provided by a conventional compression process using a motor driven compressor before the vaporized refrigerant is passed through a turbine for converting kinetic energy in the refrigerant into electrical energy. The system taught herein also uses energy in cooling water supplied to the compressor to augment the energy in the vaporized refrigerant.

The systems described in the '170 and '585 patents require complex heat exchangers and piping or a motor-driven compressor in order to extract energy from the refrigerant. Accordingly, it is an object of the present invention to provide a relatively simple system with heat exchangers supplied from a single working fluid and without motor driven compressors in a normal operating mode for providing a refrigerated air flow while extracting energy from a refrigerant.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise an air conditioner system having a boiler for generating a refrigerant vapor from a liquid refrigerant therein and a condenser for condensing the refrigerant vapor to the liquid refrigerant. An expander connects the boiler and the condenser to generate output energy when the refrigerant vapor passes therethrough from the boiler to the condenser in a first direction. A fan produces an ambient air flow through the boiler and the condenser to provide heat input for vaporizing the liquid refrigerant in the boiler and cooling the air flow and for extracting heat from the condenser to condense the refrigerant vapor to the liquid refrigerant. A water mist is generated that contacts the air flow intermediate the boiler and the condenser for further cooling the air flow through heat of vaporization of the water so that air exiting the condenser is cooler than the ambient air flow entering the boiler. The further cooling of the air flow produces air at a temperature effective to condense the refrigerant vapor flowing in the first direction at a rate that produces a pressure differential in the refrigerant vapor between the boiler and the condenser that results in sufficient kinetic energy in the refrigerant vapor passing through the expander to produce a net surplus of output energy.

In one embodiment, the boiler, condenser, and expander can operate as a condenser, boiler, and compressor, respectively, under high humidity conditions to function as a more conventional air conditioner. Rotatable baffles act to segregate the air flow through the boiler and condenser in the absence of the water mist.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

In accordance with the present invention, the heat of vaporization of water is used to produce cool air and electric power in an air conditioner energy system (ACES). ACES is most efficient in a relatively warm dry climate where increased amounts of the heat of vaporization (580 calories per gram at standard condition) are released as the driving energy of the system. An ACES unit, placed on a rooftop, can cool air for use in space cooling and generate excess electric power that can be used by the home or sold back to an electrical utility grid.

Figure 1:
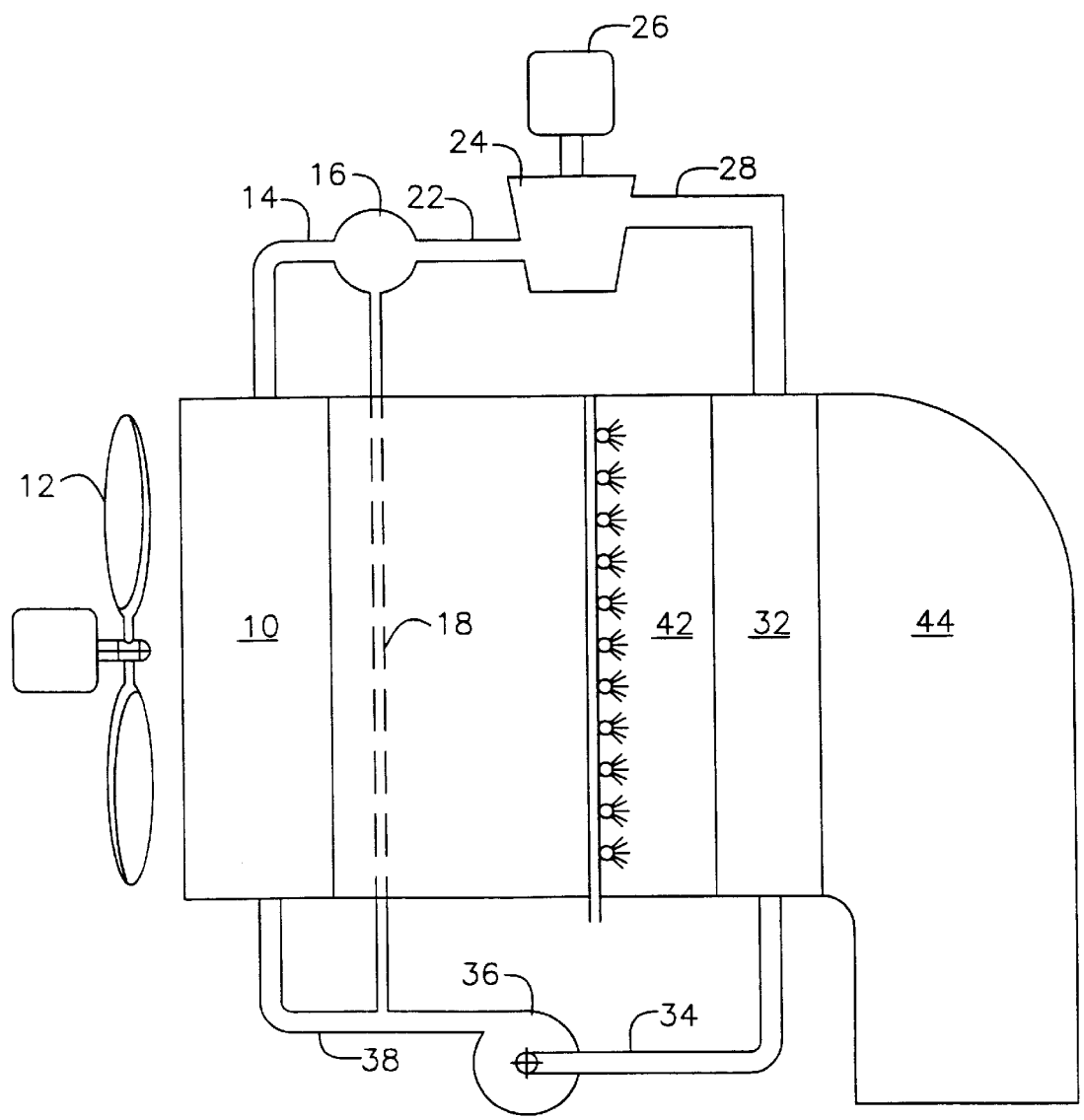
FIG. 1 is a schematic drawing in side view of one embodiment of the present invention.

Referring first to FIG. 1, a side view of an ACES unit is depicted. A liquid refrigerant is introduced into boiler 10, which is preferably formed of tubes with external fins for efficient heat transfer between a surrounding medium and the contents of the tubes. Motor driven fan 12 directs a warm air flow through boiler 10 and across the finned tubes, where heat is transferred from the air to the refrigerant within the tubes. This heat exchange boils the refrigerant and cools the air.

Refrigerant vapor flows through conduit 14 to a conventional liquid-vapor separator 16, where any liquid refrigerant is returned to the bottom of boiler 10 through line 18. Refrigerant vapor flows through conduit 22 to expander 24 and into conduit 28 for introduction into condenser 32. Expander 24 is any device for converting fluid kinetic energy into mechanical energy, and is conventionally a turbine device. Mechanical energy from expander 24 is preferably converted to electrical energy by motor/generator 26.

Refrigerant vapor is expanded and cooled by passing through expander 24 and is passed to condenser 32 to transfer heat to the same air flow that passed through boiler 10, as explained below, and condense back to a liquid.

Condenser 32 is also preferably formed of a finned tube construction for efficient transfer of energy from the refrigerant vapor to an external medium. Liquid refrigerant is delivered by return line 34 to pump 36, which completes the refrigerant circuit by returning the liquid refrigerant to boiler 10 through line 38. Pump 36 is not a compressor and provides only the pressure increase necessary to overcome the pressure difference between condenser 32 and boiler 10.

In accordance with the present invention, a water mist 42 is provided to intercept air flowing from boiler 10 to condenser 32. Water in mist 42 evaporates into the air and cools the air, which as already been initially cooled by the boiling refrigerant in boiler 10. It is preferred for the air flow to have a low relative humidity in order to maximize the water evaporation and concomitant temperature decrease of the air and of the refrigerant in condenser 32. As the air enters condenser 32, the temperature of the air is actually below the wet-bulb temperature of the ambient air because of the pre-cooling of the air in boiler 10.

It will be appreciated that the air flowing through water mist 42 and into condenser 32 also includes entrained water droplets that coat the finned tubes in condenser 16 that contain the refrigerant. Further evaporation of water from the tubes and fins, along with the cooled air medium, extract heat from the condensing refrigerant vapor in condenser 32. In a preferred embodiment, fins on the condenser 32 tubes are slanted down so that any remaining water drains from condenser 32 to prevent scale and mineral buildup on the fins that would retard heat transfer. The air exiting from condenser 32 is slightly warmed by the heat of condensation of the refrigerant in condenser 32, but the air is still cooler than the ambient air that enters evaporator 10 and is delivered through duct 44 to the space to be cooled.

Mist 42 may be generated by any convenient apparatus. A preferred generator is a simple spray system that sprays water droplets toward condenser 32. It will be appreciated that the generator may also be a vertical spray device. Yet another suitable mist generator is a rotating disk in a pan of water that is driven by an electric motor to "sling" water droplets upward into the path of the air flow.

Figure 2:
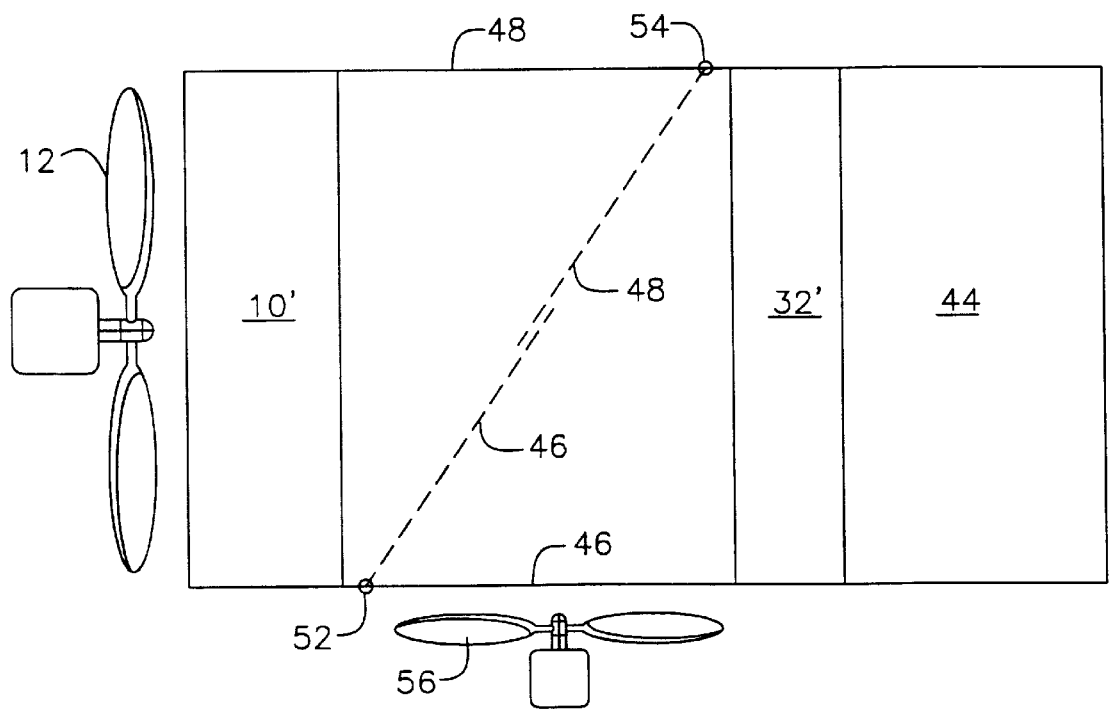
FIG. 2 is a schematic drawing in top view of an embodiment of the invention shown in FIG. 1.

FIG. 2 schematically depicts a top view of one embodiment of ACES that permits the unit to be converted into a standard refrigeration air conditioning system when the ambient humidity is too high. Under these conditions, there is not sufficient water evaporation to cool the air flow to a temperature that permits sufficient condensation in condenser 32 (FIG. 1) that produces a pressure differential between evaporator 10 and condenser 32 effective to generate a kinetic energy in refrigerant vapor to generate electricity. ACES may be provided with side walls 46, 48 that are hinged at locations 52, 54, respectively, that can rotate to the interior positions shown by the dashed lines. Side walls 46, 48 may be rotated to the interior positions either manually or by small motors (not shown) that are actuated by humidity sensing instrumentation. Rotated side walls 46, 48 now form a baffle that directs air from fan 12 through boiler 10', which now functions as a condenser, and air from fan 56 through condenser 32', which now functions as an evaporator.

Referring again to FIG. 1, when ACES is in a refrigeration configuration, both expander 24 and motor-generator 26 are reversed in operation from the electrical power generation mode. Motor-generator 26 now functions as a motor to drive expander 24 in reverse to act as a compressor. Alternatively, a separate motor and compressor could be provided in parallel with expander 24 and generator 26 with appropriate valves to separate the functions.

In the refrigeration mode, air flow from fan 56 is diverted by rotated side walls 46, 48 through evaporator 32', where the air is cooled by the heat of evaporation of the refrigerant within evaporator 32' and directed through duct 44 into the space to be cooled. As shown in FIG. 1, the refrigerant vapor is now compressed by expander/compressor 24 and flows through conduit 22, 14 into condenser 10'. Fan 12 now directs ambient air flow through condenser 10' to extract heat from the condensing refrigerant. The heated air is now directed out of the unit by rotated side walls 46, 48. Pump 36 (FIG. 1) is operated in reverse to move the liquid refrigerant from condenser 10' though pipes 38, 34 into evaporator 32' to complete the cycle.

The performance of ACES in the electrical generating mode has been simulated in numerical calculations. As an example, consider a hot day in Tucson, Ariz., where the ambient air temperature is 35° C. (95° F.) and the relative humidity is 15%. In one simulation, the air leaving boiler 10 (FIG. 1) is 26.4° C. As the air enters condenser 32, the air temperature is 14° C., having been cooled by water mist 42. The air leaving condenser 32 is 17.2° C., which is still slightly below the wet-bulb temperature (17.5° C.) of the ambient air. If boiler 10 and condenser 32 are both 1.52 m (5 ft.) high and 2 m (6.5 ft.) wide, the calculated power output from motor-generator 26 is 2 kW after subtracting the energy required by pump 36 and fan 12. Other system inefficiencies would be expected to lower the net output power to about 1 kW of electrical power.

It will be appreciated that the primary thrust of the present invention is to use the energy in the heat of vaporization of water to generate electrical power. In the application presented above, ambient air is cooled in the process and the apparatus is adapted for use as an air conditioner, but this is not required. The exhaust air could be simply discharged back into the surrounding atmosphere. Likewise, the use of ambient air is not required. Heated exhaust air from another source could be used as the input air to boil the refrigerant so that energy is extracted from the heated exhaust.

The foregoing description of air conditioner energy system for delivering cooled air and a net output of electrical energy has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An air conditioner system comprising:
    a boiler for generating a refrigerant vapor from a liquid refrigerant therein;
    a condenser for condensing said refrigerant vapor to said liquid refrigerant;
    an expander connecting said boiler and said condenser to generate output energy when said refrigerant vapor passes therethrough from said boiler to said condenser in a first direction;
    a fan for producing an ambient air flow through said boiler and said condenser to provide heat input for vaporizing said liquid refrigerant in said boiler and cooling said air flow and for extracting heat from said condenser to condense said refrigerant vapor to said liquid refrigerant; and means for generating a water mist contacting said air flow intermediate said boiler and said condenser for further cooling said air flow through heat of vaporization of said water so that air exiting said condenser is cooler than said ambient air flow entering said boiler, where said further cooling of said air flow produces air at a temperature effective to condense said refrigerant vapor at a rate that produces a pressure differential between said boiler and said condenser that results in sufficient kinetic energy in said refrigerant vapor passing through said expander to produce a net surplus of said output energy.

2. An air conditioner system according to claim 1, wherein said means for generating a water mist is a water spray system.

3. An air conditioner system according to claim 1, wherein said boiler and said condenser are configured to perform as a second condenser and second boiler, respectively, when said refrigerant vapor moves in a second direction that is opposite said first direction.

4. An air conditioner system according to claim 3, wherein said expander includes a motor to power said expander as a compressor when said refrigerant vapor passes therethrough in said second direction.

5. An air conditioner system according to claim 3, further including:
  a rotatable baffle for segregating air flow through said second condenser from air flow through said second boiler; and
  a second fan for producing an ambient air flow through said second boiler when said baffle is rotated for segregating said air flow.

6. An electrical power generating system comprising:
  a boiler for generating a refrigerant vapor from a liquid refrigerant therein;
  a condenser for condensing said refrigerant vapor to said liquid refrigerant;
  an expander connecting said boiler and said condenser to generate output energy when said refrigerant vapor passes therethrough from said boiler to said condenser in a first direction;
  a fan for producing an air flow through said boiler and said condenser to provide heat input for vaporizing said liquid refrigerant in said boiler and cooling said air flow and for extracting heat from said condenser to condense said refrigerant vapor to said liquid refrigerant; and
  means for generating a water mist contacting said air flow intermediate said boiler and said condenser for further cooling said air flow through heat of vaporization of said water so that air exiting said condenser is cooler than said air flow entering said boiler, where said further cooling of said air flow produces air at a temperature effective to condense said refrigerant vapor at a rate that produces a pressure differential between said boiler and said condenser that results in sufficient kinetic energy in said refrigerant vapor passing through said expander to produce a net surplus of said output energy.

7. An electrical power generating system according to claim 6, wherein said means for generating a water mist is a water spray system.

* * * * *